(12) United States Patent
Lassoued et al.

(10) Patent No.: US 11,194,849 B2
(45) Date of Patent: Dec. 7, 2021

(54) LOGIC-BASED RELATIONSHIP GRAPH EXPANSION AND EXTRACTION

(71) Applicant: INTERNATIONAL BUSINESS MACHINES CORPORATION, Armonk, NY (US)

(72) Inventors: Yassine Lassoued, Dublin (IE); Lea Deleris, Paris (FR); Radu Marinescu, Dublin (IE); Julien Monteil, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 249 days.

(21) Appl. No.: 16/128,491

(22) Filed: Sep. 11, 2018

(65) Prior Publication Data
US 2020/0082016 A1 Mar. 12, 2020

(51) Int. Cl.
*G06F 16/33* (2019.01)
*G06N 5/04* (2006.01)
*G06F 16/901* (2019.01)
*G06N 20/00* (2019.01)

(52) U.S. Cl.
CPC ...... *G06F 16/3338* (2019.01); *G06F 16/9024* (2019.01); *G06N 5/04* (2013.01); *G06N 20/00* (2019.01)

(58) Field of Classification Search
USPC ........................................ 707/765
See application file for complete search history.

(56) References Cited

U.S. PATENT DOCUMENTS

| | | | |
|---|---|---|---|
| 6,480,843 B2 | 11/2002 | Li | |
| 7,730,085 B2 | 6/2010 | Hassan et al. | |
| 9,563,901 B2 | 2/2017 | Fleischman et al. | |
| 9,747,390 B2* | 8/2017 | Cooper | G06F 40/242 |
| 9,886,950 B2* | 2/2018 | Karov | G06F 16/36 |
| 10,437,833 B1* | 10/2019 | Nguyen | G06F 40/30 |
| 2007/0118542 A1* | 5/2007 | Sweeney | G06F 16/367 |
| 2008/0021925 A1* | 1/2008 | Sweeney | G06F 16/84 |
| 2008/0104032 A1 | 5/2008 | Sarkar | |
| 2008/0172360 A1 | 7/2008 | Lim et al. | |
| 2009/0112841 A1* | 4/2009 | Devarakonda | G06F 16/36 |
| 2009/0327205 A1* | 12/2009 | Sweeney | G06F 16/84 |
| | | | 706/54 |

(Continued)

OTHER PUBLICATIONS

Grainger et al., "The Semantic Knowledge Graph: A compact, auto-generated model for real-time traversal and ranking of any relationship within a domain," arXiv:1609.00464v2 [cs.IR], Sep. 5, 2016 (10 pages).

(Continued)

*Primary Examiner* — Cam Linh T Nguyen
(74) *Attorney, Agent, or Firm* — Griffiths & Seaton PLLC (57) ABSTRACT

Embodiments for relationship graph expansion and extraction from a collection of unstructured text data by a processor. A query relating to one or more concepts may be received. The query may be expanded according to a logical reasoning operation and a domain ontology having a set of logical rules. A relationship graph between one or more concepts from a plurality of unstructured text data may be extracted based on an expanded query according to a domain ontology and the set of logical rules.

20 Claims, 7 Drawing Sheets

(56) References Cited

U.S. PATENT DOCUMENTS

| | | | | |
|---|---|---|---|---|
| 2012/0096143 A1* | 4/2012 | Suit | .................... | H04L 41/145 709/224 |
| 2013/0086063 A1 | 4/2013 | Chen et al. | | |
| 2013/0138586 A1* | 5/2013 | Jung | .................... | G06N 20/00 706/12 |
| 2014/0188862 A1* | 7/2014 | Campbell | .................... | G06F 16/248 707/728 |
| 2016/0019299 A1* | 1/2016 | Boloor | .................... | G06F 16/36 705/3 |
| 2016/0203221 A1* | 7/2016 | Rao | .................... | G06Q 50/01 707/707 |
| 2016/0316032 A1 | 10/2016 | Brunn et al. | | |
| 2016/0353172 A1 | 12/2016 | Miller et al. | | |
| 2017/0024461 A1* | 1/2017 | Mac an tSaoir | .................... | G06F 16/334 |
| 2018/0129695 A1* | 5/2018 | Standefer, III | .................... | G06F 16/248 |
| 2018/0129697 A1* | 5/2018 | Mullins | .................... | G06F 16/2365 |
| 2018/0129715 A1* | 5/2018 | Standefer, III | .................... | G06F 16/9535 |
| 2018/0260442 A1* | 9/2018 | Vaidhyanathan | .................... | G06F 16/9024 |

OTHER PUBLICATIONS

Jochim et al., "Extracting Dependence Relations from Unstructured Medical Text," Studies in health technology and informatics, Aug. 2015 (2 pages).

Lassoued et al., "Thesaurus-Based Hierarchical Semantic Grouping of Medical Terms in Information Extraction," European Federation for Medical Informatics (EFMI) and IOS Press, 2016 (5 pages).

Wu et al., "Personalized Query Expansion Utilizing Multi-Relational Social Data," IEEE, 2017 (6 pages).

Yahya et al., "Relationship Queries on Extended Knowledge Graphs," WSDM '16, Feb. 22-25, 2016 (10 pages).

Carvalho et al., "Graphia: Extracting Contextual Relation Graphs from Text," 2013 (5 pages).

Mukhopadhyay et al., "Multi-way association extraction and visualization from biological text documents using hyper-graphs: Applications to genetic association studies for diseases," Artificial Intelligence in Medicine, 2010 (10 pages).

* cited by examiner

LOGIC-BASED RELATIONSHIP GRAPH EXPANSION AND EXTRACTION

BACKGROUND OF THE INVENTION

Field of the Invention

The present invention relates in general to computing systems, and more particularly to, various embodiments for logic-based extraction and expansion of relationship graphs using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for logic-based extraction and expansion of a relationship graph, by a processor, are provided. In one embodiment, by way of example only, a logic-based method for extracting and expanding a graph, again by a processor, is provided. A query relating to one or more concepts may be received. The query may be expanded according to a logical reasoning operation and a domain ontology having a set of logical rules. A relationship graph between one or more concepts from a plurality of unstructured text data may be extracted based on an expanded query according to a domain ontology and the set of logical rules.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As the amount of electronic information continues to increase, the demand for sophisticated information access systems also grows. Digital or "online" data has become increasingly accessible through real-time, global computer networks. The data may reflect many aspects of the behavior of groups or individuals in a population. Many data-intensive applications require the extraction of information from data sources, such as, for example, from a political, security and counter terrorism, healthcare, government, educational, or business environment.

For example, large resources of text documents are readily available and continue to be produced at a large scale (e.g., medicine, crime data, social media, etc.). However, identifying direct relationship statements between two concepts of interest (or in semantic variants) may not be possible thus requiring additional reasoning to retrieve relevant answers to the query. Accordingly, there is a need to automatically extract structured information to facilitate knowledge discovery, data processing, reasoning, etc., often in the form of relationships/interactions between concepts.

Various embodiments described herein provide a logic-based relationship graph extraction operation for extracting a graph of relationships between concepts from text data based on a user query (e.g., input query) according to a domain ontology including a set of logical rules (axioms) for logical reasoning. That is, the present invention expands the search space of a user input query, using logical rules and a domain ontology, to retrieve relevant results.

In an additional aspect, mechanisms of the illustrated embodiments provide for logic-based query expansion and graph extraction. A query relating to one or more concepts may be received. The query may be expanded according to a logical reasoning operation and a domain ontology having a set of logical rules. A relationship graph between one or more concepts from a plurality of unstructured text data may be extracted based on an expanded query according to a domain ontology and the set of logical rules.

Thus, the present invention expands a search space of the user input query to cover a wider set of concepts and interactions that are relevant to the input query. A logical reasoning operation may be applied to extracted interactions in order to infer new knowledge (i.e., infer new relationships that have not been asserted in a text corpus). A user is provided with a wider and more informed view of both direct and indirect interactions between a concept (e.g., a phenomena) of interest, through other concept/phenomena that have not been taken into consideration by users.

It should be noted as used herein a "concept" may be the formalization of a real or virtual thing or an idea, such as a particular medical condition (e.g., Eczema), disorder (e.g., Sleep Apnea), behavior (e.g., smoking), etc. A semantic type or class may be a category of concepts, individuals, instances that share something in common (i.e., the semantic type) such as, for example, disease, disorder, behavior, substance, etc. A relationship may be a binary link between a source concept and a target concept such as, for example, "causes," "improves," "affects," and the like. For example, in the phrase "smoking may cause lung cancer," the relationship may be the "cause" and the relationship links the source concept "smoking" to a target concept "lung cancer." The semantic type of smoking may be "Behavior," and the semantic type of "lung cancer" may be "Disease."

Ontology, or the term "ontology," may be understood in its broadest sense. That is, the term ontology is a term intended to have its ordinary meaning. "Ontology" may include, but not limited to, anything that can be modeled as an ontology, including but not limited to, taxonomies, thesauri, vocabularies, dictionaries, and the like. For example, an ontology may include information or content relevant to a domain of interest or content of a particular class or concept. Content can be any searchable information, for example, information distributed over a computer-accessible network, such as the Internet. The ontology can be continuously updated with the information synchronized with the sources, adding information from the sources to the ontology as models, attributes of models, or associations between models within the ontology. A semantic network may be a particular type of ontology, consisting of a set of semantic types (e.g., classes), and possible binary relationships that may occur between concepts (e.g., instances/individuals) of these types.

In one aspect, the term "domain" is a term intended to have its ordinary meaning. In addition, the term "domain" can include an area of expertise for a system or a collection of material, information, content and/or other resources related to a particular entity or subject or subjects relating to the entities. For example, a domain can refer to governmental, financial, healthcare, advertising, commerce, scientific, industrial, educational, medical and/or biomedical-specific information. A domain can refer to information related to any particular entity and associated data that may define, describe, and/or provide a variety of other data associated with one or more entities. The domain can also refer to subject matter or a combination of selected subjects.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
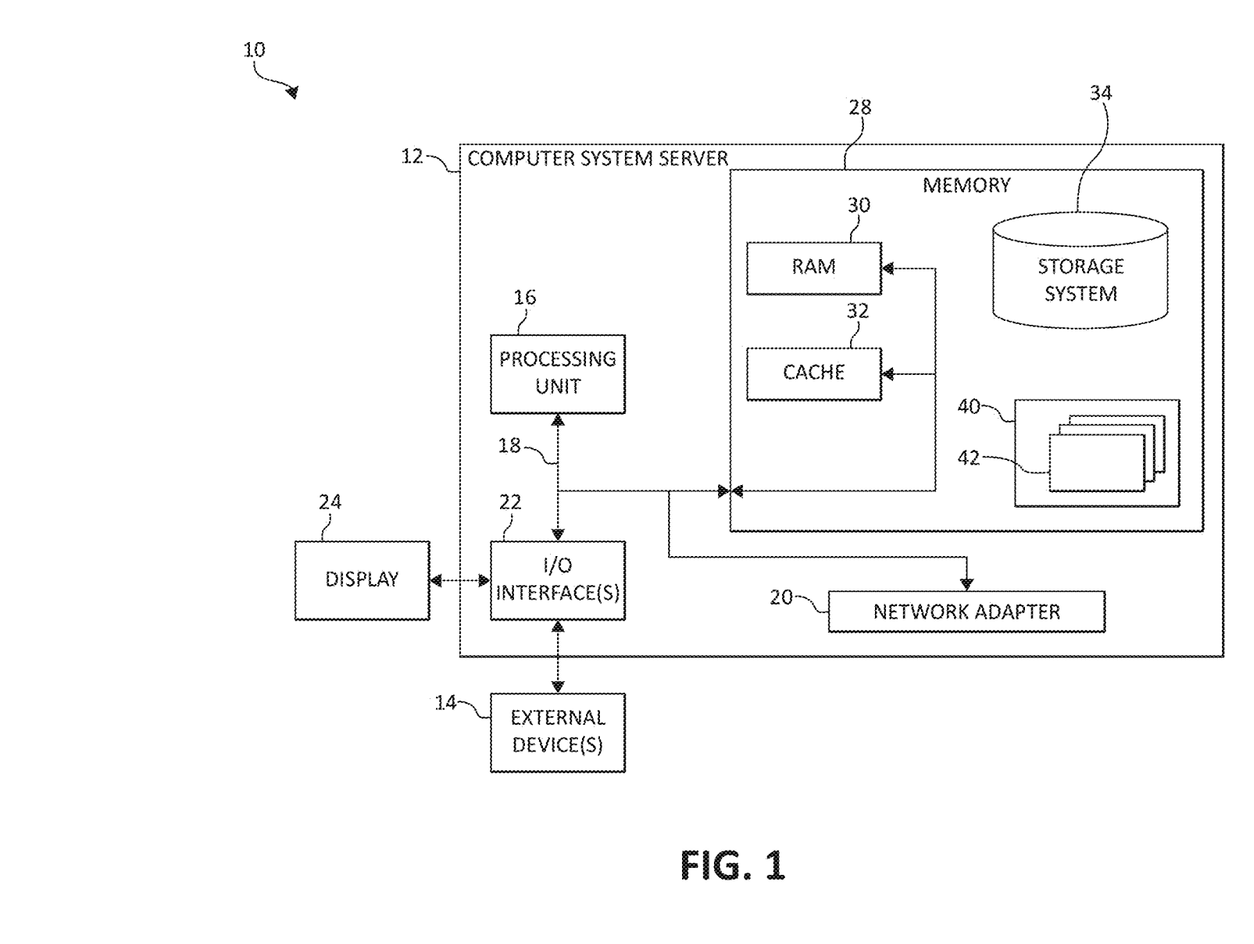
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
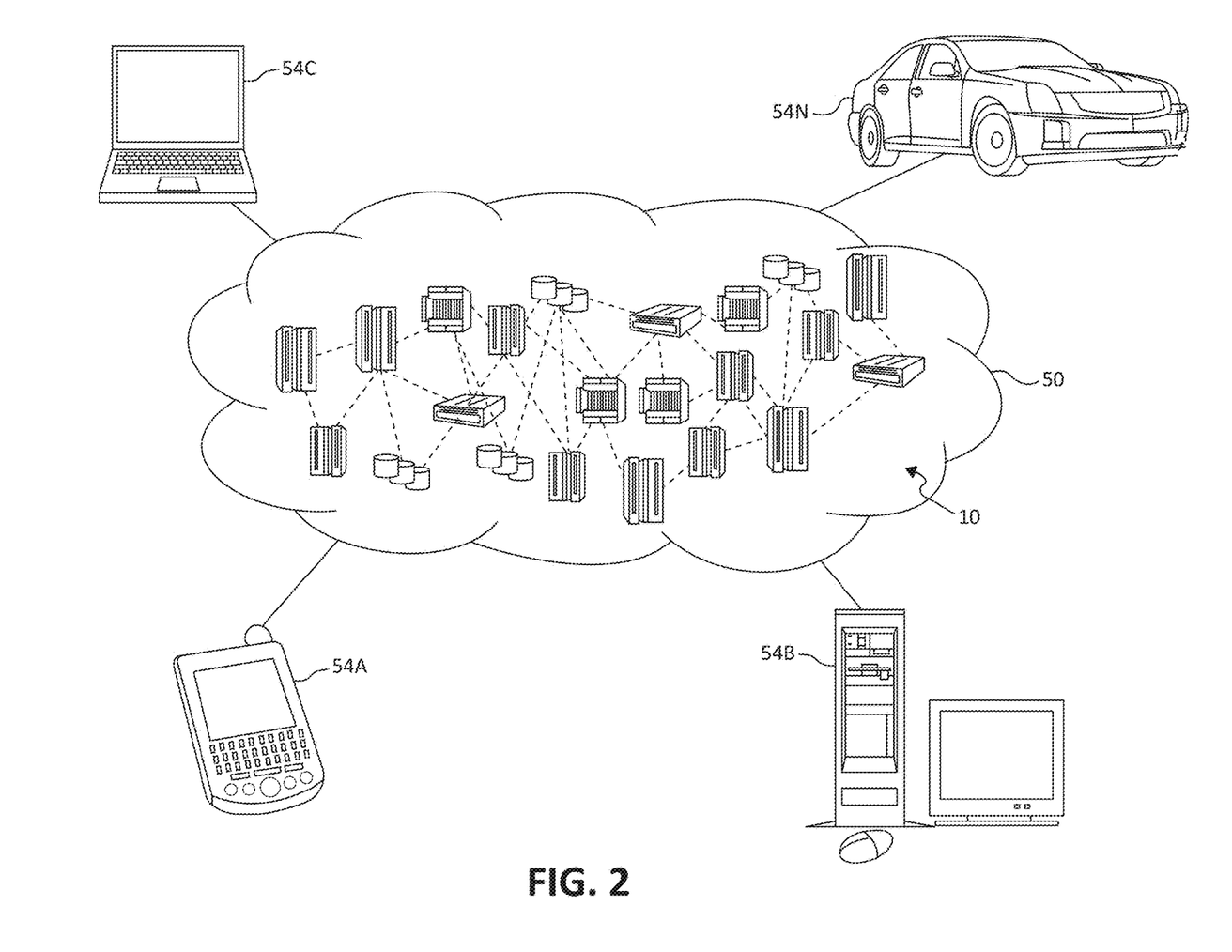
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
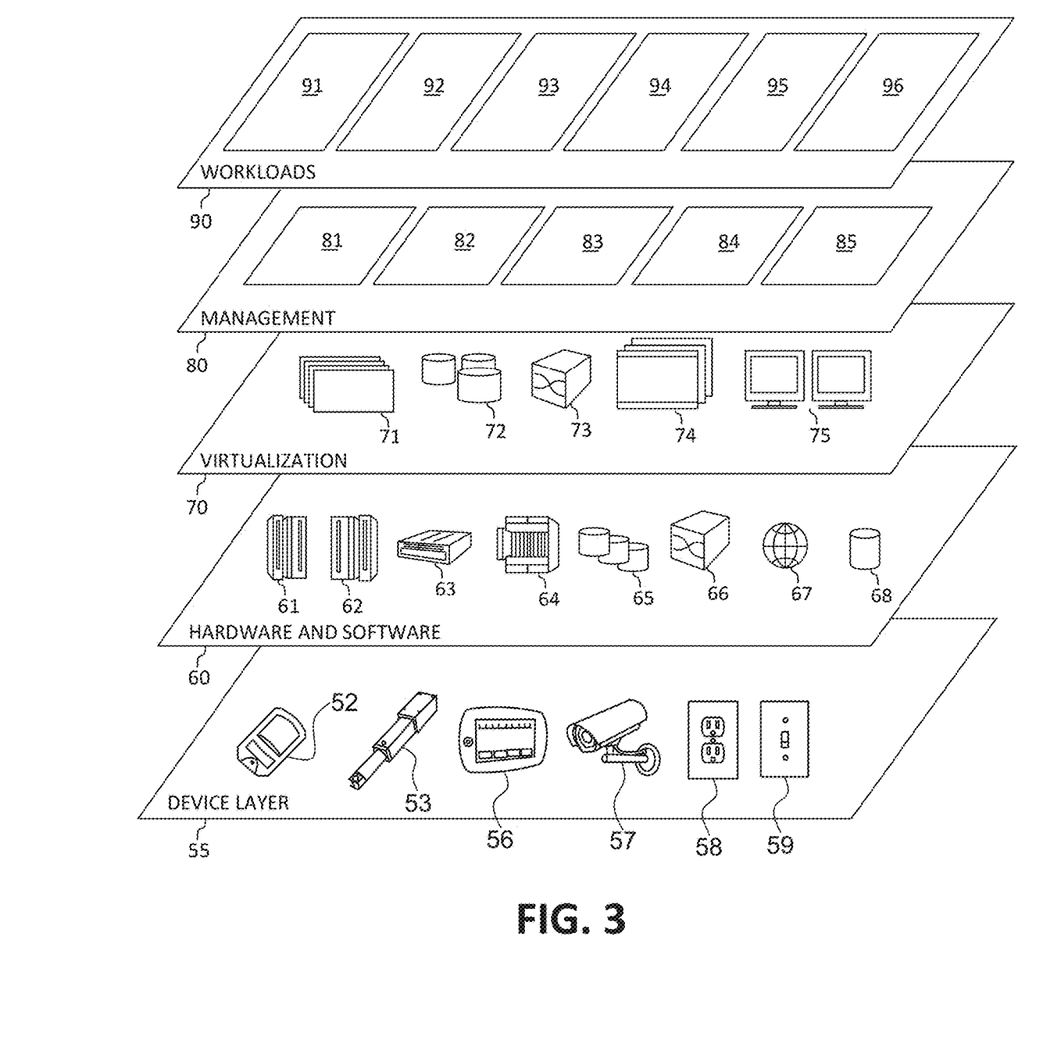
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various sentiment information workloads and functions 96 for logic-based relationship graph expansion and extraction. In addition, workloads and functions 96 for logic-based relationship graph expansion and extraction may include such operations as data analysis (including data collection and processing from various environmental sensors), and predictive data analytics functions. One of ordinary skill in the art will appreciate that the workloads and functions 96 for logic-based relationship graph expansion and extraction may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for extraction of a graph of relationships between concepts (phenomena) from an unstructured data (e.g., a natural text corpora) based on an input user query according to a domain ontology including a set of logical rules (axioms) to use by a logical reasoning operation. The user query may be expanded using reasoning over the domain ontology and logical rules so as to widen a search space of relationship extraction. The expanded search space includes additional concept and relationship types to provide an expanded relationship graph of the potential direct and indirect interactions between the phenomena of interest and also through other phenomena that the user and/or a computing system may have been unaware. A reasoning operation may be used to further infer new relationships that may have not been directly asserted in the input text corpora.

In additional aspects, one or more relationship statements may be extracted from a plurality of unstructured text data according to the expanded query with associated confidence scores. One or more relationship statements may be asserted and/or inferred with an associated confidence scores from the one or more extracted relationship statements using the domain ontology and a set of logical rules. A relationship graph may be extracted. The extracting operation of a relationship graph may further include combining both extracted and inferred relationships, and direct and indirect relationships between the one or more concepts using the domain ontology and a set of logical rules.

Figure 4:
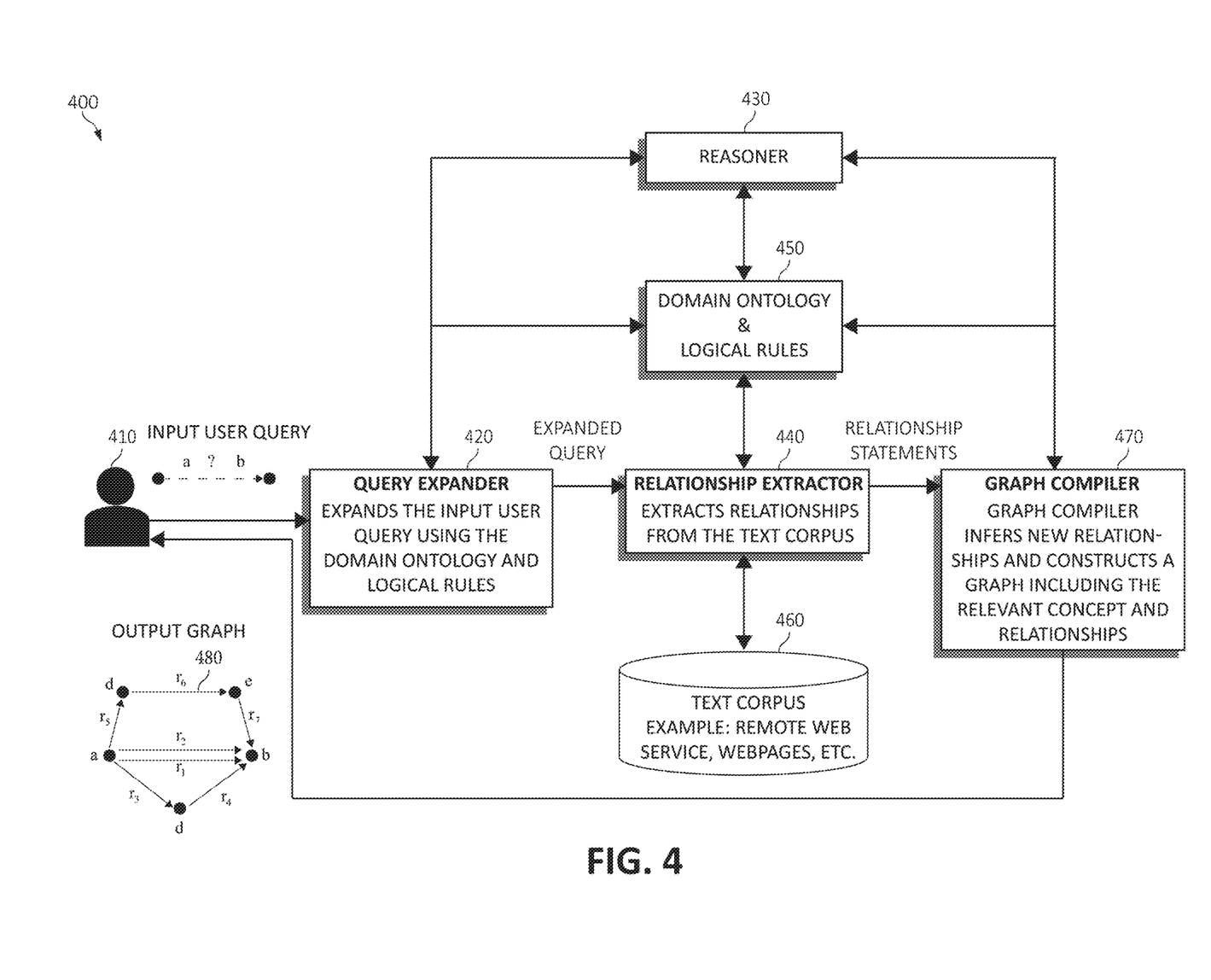
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for extraction and expansion of a logic-based relationship graph in a computing environment. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the blocks 400 may also be incorporated into various hardware and software components of a system for logic-based extraction and expansion of relationship graphs in accordance with the present invention. Many of the functional blocks 400 may execute as background processes on various components, either in distributed computing components, or on the user device, or elsewhere.

In operation, a user 410 may input a user query for one or more concepts (e.g., "a" and "b"). In one aspect, the user query may include a subject (e.g., concept), a predicate (e.g., relationship), object (e.g., concept), with the constraint that at least one of them (e.g., the subject, predicated, object, etc.) is specified. This includes for example asking for all relationships involving, for example, "smoking" as subject, and/or all relationships relating to smoking with coffee consumption, and/or all causal relationship involving smoking as the subject.

A query expander 420 may receive the query from the user 410 and expand the input user query using a domain ontology 450 (e.g., a database that may also include a set of logical rules). The domain ontology 450 may include (1) a concept thesaurus, (2) a semantic network, which defines the possible relationships that may hold between concept types, one or more associations between thesaurus concepts and their semantic types, and/or (3) logical rules above the semantic types and relationships of the semantic network.

The expanded query may be sent to the relationship extractor 440. The relationship extractor 440 may extract one or more relationship statements from a plurality of unstructured text data (e.g., a text corpus 460) according to a domain ontology 450 having one or more logic rules and a logical reasoning operation via reasoner 430. The reasoner 430 (which may be a module or application controlled by a processor device) may be able to apply one or more domain logic rules to expand the input query and to infer new relationships from the extracted relationship statements.

In one aspect, the text corpus 460 may be a remote web service, webpage, etc. More specifically, the relationship extractor 440 may extract one or more relationship statements from a plurality of unstructured text data according to the expanded query.

A graph compiler 470 may infer one or more new and/or additional relationships amongst the concepts of the extracted relationship statements and expanded query. The graph compiler 470 may construct a graph 480 that includes one or more relevant concepts and relationships. The graph compiler 470 may assert and/or infer one more statements (with an associated confidence measure in the form for instance of a probability) from one or more relationship statements extracted from the plurality of unstructured text data based on the expanded query. The graph compiler 470 may identify a direct relationship from relationship statements between concepts using the domain ontology 450. Also, the graph compiler 470 may infer an indirect relationship from one or more relationship statements between the one or more concepts using the domain ontology 450.

The graph compiler 470 may combine both direct relationships and an indirect relationship between the one or more concepts using the domain ontology and a set of logical rules for extracting the relationship graph 480.

To further illustrate, consider the following example. Assume a relationship is intended to be extracted from natural language text by extracting relationship statements that express direct links between two concepts of interest. For example, for the input concepts "smoking" and "cancer" of a query, one or more statements may be extracted such as, for example: "smoking is a risk factor for many cancers."

Moreover, a semantic variant of concepts may be used such as, for example, synonyms and semantically related concepts using semantic knowledge (e.g., thesaurus, language model, etc.). For example, semantic variants of concepts may return statements such as, for example: "In addition, cigarettes contribute to cancers of the kidney, bladder, pancreas and stomach." However, finding such direct relationship statements between two concepts of interest (or semantic variants of the relationship statements) may not be guaranteed and in some cases even possible. Thus, the functionality of FIG. 4 provides for logical reasoning to retrieve relevant answers. For example, the text corpus may fail to explicitly include any statement about the effects of "chocolate" on "eczema." However, using the functionality of FIG. 4, the following statements in the text corpus may be located and identified such as, for example: "Oral nickel intake may aggravate vesicular hand eczema," and "Certain food items such as, for example, cocoa and chocolate, have very high nickel contents." The operations of FIG. 4 may combine both statements and may infer that "chocolate" may aggravate "vesicular hand eczema", since chocolate has high nickel contents.

Figure 5A:
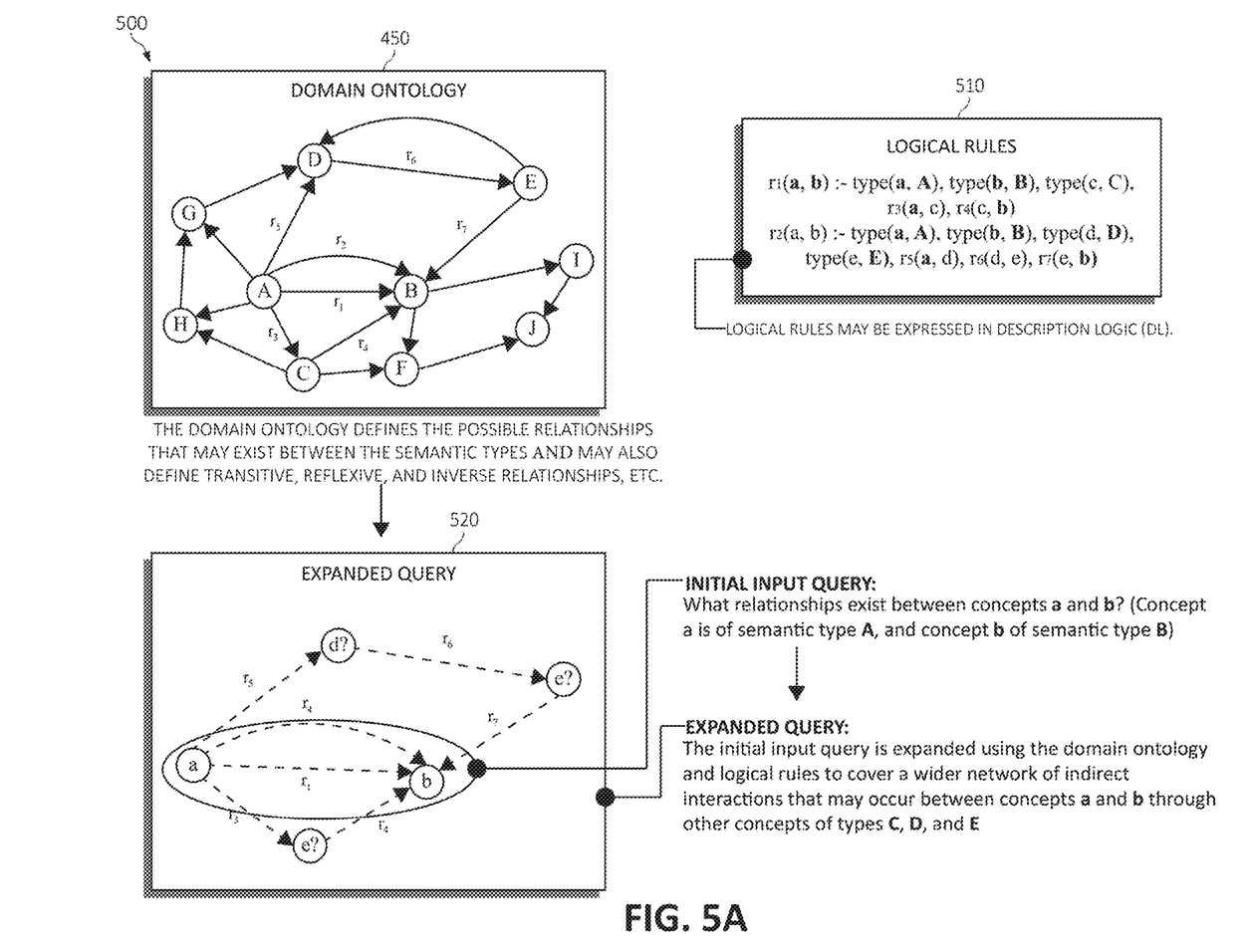
FIG. 5A is a diagram depicting an operation for expanding a query in accordance with aspects of the present invention.
Figure 5B:
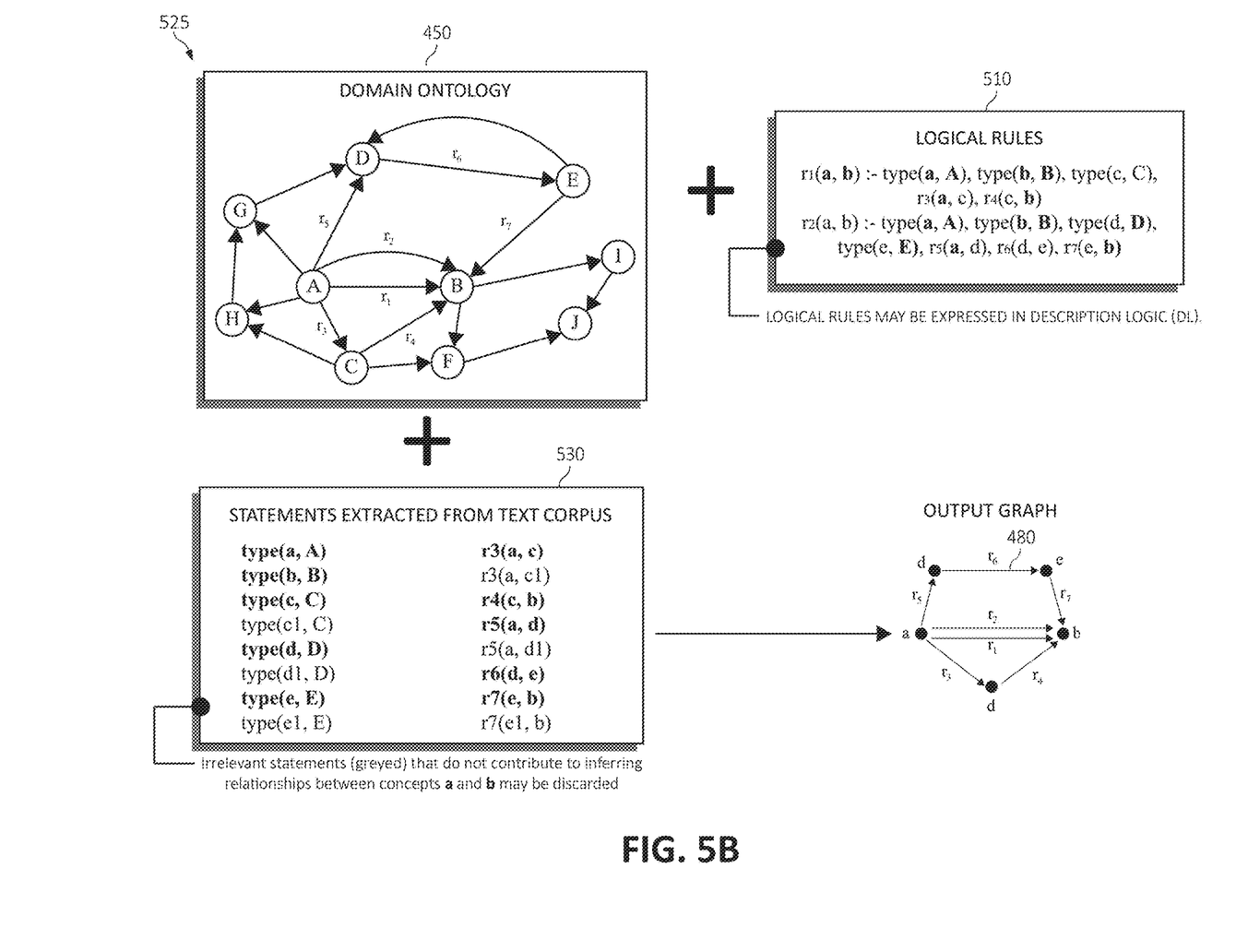
FIG. 5B is a diagram depicting compiling of a relationship graph in accordance with aspects of the present invention.

Turning now to FIGS. 5A-5B are diagrams 500 and 525 depicting operations for query expansion and relationship graph compilation in accordance with aspects of the present invention. The domain ontology 450 of FIG. 4 is depicted and may define one or more possible relationships that may exist or be present between one or more semantic types. The domain ontology 450 may define transitive, reflexive, and/or inverse relationships and the like. The logical rules 510 (e.g., a database of a set of logical rules) may be used and expressed in a descriptive logic ("DL"). Using the initial input query, a query expansion operation may identify what, if any, type of direct and indirect relationships exist between concepts a and b (e.g., a concept "a" may be a semantic type A and concept b may be a semantic type B).

An expanded query may be generated from expanding the initial input query using the domain ontology 450 and logical rules 510. The logical rules 510 may be used to capture and/or expand indirect interactions that may occur between concepts "a" and "b" through other concept types such as, for example, type C, D, and E. A relationship extraction operation may be performed using a machine learning operations (e.g., conditional random fields, etc.), and/or rule-based approaches. The relationship extraction operation returns a set of plausible relationships as statements of the form: source concept, relationship term, target concept, and possibly an associated confidence score.

Consider, further, the following query expansion operation using concepts a and b, an ontology ("O") represented by as directed graph "G", and initial logic rules ("KB", i.e., knowledge base) provided as input. An expanded query ("expq(a,b)") may be generated as output. The procedure may be performed according to the following procedure:

$$\text{Initialise expq}(a,b) = \{a,b\} \quad (1),$$

in a repetitive and incremental order (from 1 to a predefined number "K"), a "k" number of shortest directed paths between a and b in G may be located and identified (e.g., using breadth-first search). In a repetitive order, a "k" number of shortest directed paths between "G" may be represented as "M" set of paths. Thus, if "M" is empty then return expq(a,b).

If M is not empty then for each path p in M, let F(a,b) be a logic formula extracted from the path p by taking a conjunction of types and relations represented by each of p's edges. As such, F(a,b) may be added to KB. However, if KB is inconsistent, F(a,b) may be removed and the operations may continue with the following path. Otherwise, let expq (a,b)=F(a,b) and execute expq(a,b) against the text corpus. If a user is satisfied with the statements returned by the query, the operations may stop and return expq(a,b). KB is inconsistent if it contains statements (e.g., relationships) that cannot occur simultaneously (e.g., KB={(a<b), (b<a)}.

Turning now to FIG. 5B, the relationship extractor 440 of FIG. 4 may extract one or more relationship statements 530 ("statements extracted from a text corpus) from plurality of unstructured text data according to the expanded query. As indicated, one or more irrelevant statements that do not contribute to inferring relationships between concepts a and b may be discarded (e.g., illustrated as the lighter grey colored text such as, for example, type(e1, E) and r7(e1,b). Thus, the graph compiler 470 of FIG. 4 may be used to infer one or more new and/or additional relationships between the concepts of the expanded query and construct a graph 480 that includes one or more relevant concepts and relationships. The graph compiler 470 of FIG. 4 may combine both direct relationships and an indirect relationship between the one or more concepts using the domain ontology 450 and a set of logical rules 510 for extracting the relationship graph 480 from the relationship statements 530 (e.g., statements extracted from a text corpus).

Moreover, consider the follow operation of graph compilation using one or more concepts a and b, an ontology ("O"), logic rules ("KB"), and one or more statements extracted from a text corpus ("S") provided as input. A relationship graph ("G") may be extracted and/or generated as output. The graph compilation procedure for extracting the relationship graph ("G") may be performed according to the following procedure:

$$\text{Initialise } G'=\{ \} \quad (2).$$

For each type ("T") in S, an n node representing T may be added in G'.

In a repetitive order, a pair of (n, n') nodes in G' may be selected. If KB entails a relationship statement r(n, n') between n and n', then a directed edge (e.g., n→n') may be added in G' (e.g., for entailment, add not r(n,n') to KB and run a logic resolution (theorem prover) to infer an empty clause). If KB does not entail r(n, n'), all statements relating n and n' may be removed from S. The graph compilation operation may be terminated if there are no further edges can be added to G' and the graph G' may be extracted.

In view of the foregoing components of FIGS. 1-5, consider the follow use cases. In scenario 1, assume the present invention intends to infer new statements from extracted statements. For example, assume an input query for one or more concepts asks "what is the effect of chocolate on eczema?" One or more domain logical rules may indicate: affects(x, y); contains(x, z), and affects(z, y). Using the domain logical rules, one or more statements may be extracted such as, for example, "Oral nickel intake may aggravate vesicular hand eczema" and "certain food items, e.g., cocoa and chocolate, have very high nickel contents." The statements may be extracted and identified as new inferred statements may, according to the domain logic rules affects(x, y) :- contains(x, z), and affects(z, y) such as, for example, aggravate(chocolate, eczema) with proof indicating that aggravate(nickel, eczema) contains(chocolate, nickel) (e.g., :- being a standard description logic notation, meaning "the right member implies the left member).

In scenario 2, assume the present invention intends to explain why two concepts are correlated. For example, assume the text document is located having the language "customers of inexpensive supermarkets are likely to be unhealthier than those who shop at more expensive supermarkets, say researchers." This statement causes a user to wonder whether the produce sold in inexpensive supermarkets are contributing to persons being unhealthy or if there is something else correlated to inexpensive supermarkets. A user then desires to know why inexpensive supermarkets are related to persons being unhealthy. One or more domain logical rules may indicate: associate(x, y) :- associate(x, z), and associated(z, y). Using the domain logical rules, one or more statements may be extracted such as, for example, "according to 2005-2008 national data, obesity rates tended to increase with decreased income among women" and "a large number of inexpensive supermarkets stores were assumed for low-income shoppers." Thus, the relationship graph output may provide explanations according to the rules of: associate(obesity, low-income-group), associated (low-income-group, inexpensive supermarkets).

In summary, the various components, modules, and systems as described herein provide a method for extracting a graph of direct and inferred relationships between concepts from natural text. A corpus of natural language text documents, a domain ontology, and a user query may be received as input. A relationship graph may be extracted to include asserted and inferred, direct and indirect, relationships extracted from the text corpus, including the concepts and relationships pertaining to the input user query and additional related concepts.

In one aspect, according to the domain ontology, the user input query may be expanded to take into consideration indirect relationships between the concepts of interest. One or more relationship statements may be extracted from the text corpus to respond to the expanded query. Based on the retrieved statements and domain ontology, new relationships that may have not been directly asserted in the input text corpora may be inferred. The relationship graph may be compiled according to the asserted and inferred relationship statements.

In one aspect, a theorem prover may be used to enable inferring new facts or relations between a subset of facts in the domain of logical rules. The theorem proving operation may be used to expand the user input query using the domain ontology and logical rules to request additional concepts and relationship, which may be combined to infer relationship statement relevant to the user.

The input text corpus may be analyzed and processed in order to extract relationship statements pertaining to the expanded input query. One or more new relationship statements may be inferred from the output of the expanded query using the domain ontology and one or more logical rules. The irrelevant statements extracted from the text corpus may be discarded. One or more statements may be inferred, and the output graph may include asserted and inferred probability statements (e.g., using a Bayesian network).

Figure 6:
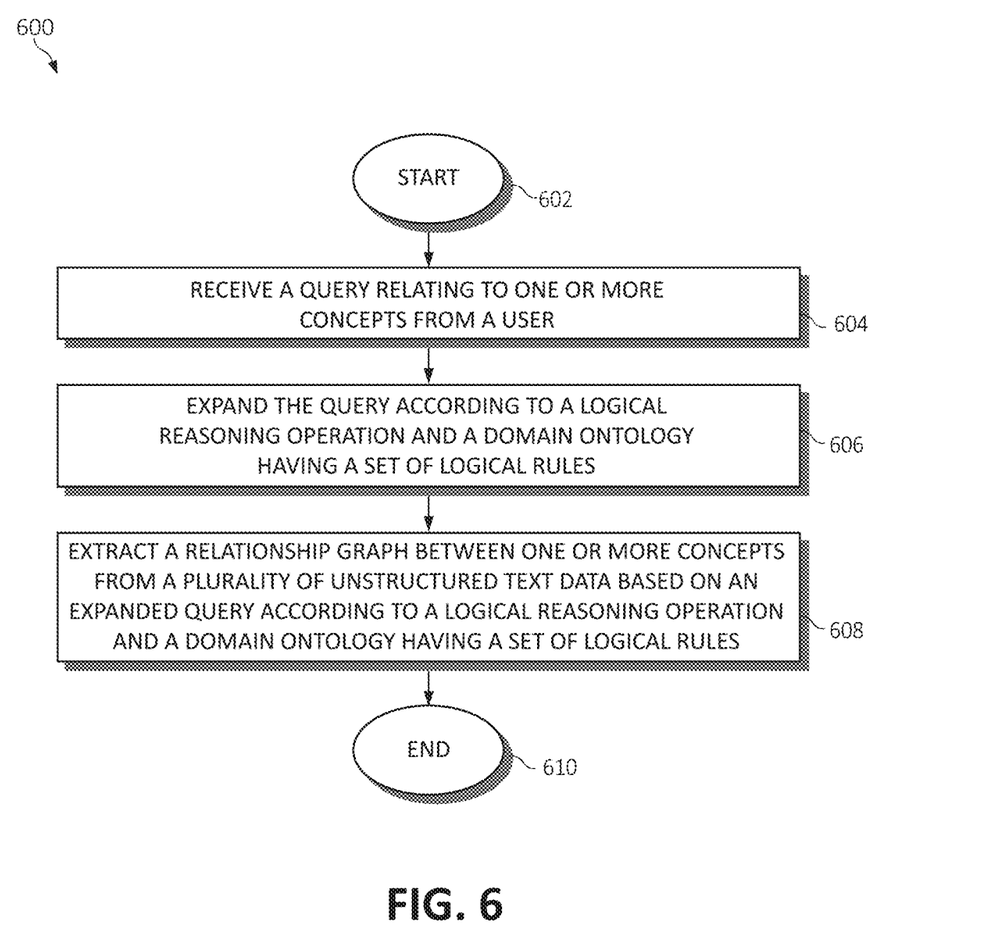
FIG. 6 is a flowchart diagram depicting an additional exemplary method for extracting and expanding a logic-based relationship graph by a processor; again, in which aspects of the present invention may be realized.

Turning now to FIG. 6, a method 600 for extracting and expanding a logic-based relationship graph from a collection of unstructured text data by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A query, relating to one or more concepts, may be received from a user, as in block 604. The query may be expanded according to a logical reasoning operation and a domain ontology having a set of logical rules, as in block 606. A relationship graph between one or more concepts from a plurality of unstructured text data may be extracted based on an expanded query according to a domain ontology and the set of logical rules, as in block 608. The functionality 600 may end, as in block 610.

In one aspect, in conjunction with and/or as part of at least one block of FIG. 6, the operation of 600 may include one or more of each of the following. The operation of 600 may extract one or more relationship statements from plurality of unstructured text data according to the expanded query.

The operation of 600 may assert or infer more statements from one or more relationship statements extracted from the plurality of unstructured text data based on the expanded query. A relationship may be identified from one or more relationship statements between the one or more concepts using the domain ontology and a set of logical rules.

In one aspect, extracting the relationship graph further includes combining both direct relationships and an indirect relationship between the one or more concepts using the domain ontology and a set of logical rules. The operation of 600 may display relationship graph in an interactive user interface (UI).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for relationship graph expansion and extraction, comprising:
 receiving, via a user interface of a computer, a user input query specifying a plurality of concepts;
 searching a plurality of unstructured text data to generate relationships between the plurality of concepts, wherein generating the relationships includes expanding the user input query using a logical reasoning operation to infer the relationships between the one or more concepts notwithstanding whether the plurality of concepts are directly asserted to one another in the plurality of unstructured text data, and wherein inferring the relationships includes identifying, within the plurality of unstructured text data, a correlation between two or more indirect and independent statements being sub-components of a respective two explicit concepts of the plurality of concepts to generate a new concept not identified in the plurality of unstructured data prior to the searching and omitted from the user input query;
 extracting a relationship graph between the plurality of concepts from the plurality of unstructured text data based on the expanded user input query according to a domain ontology, wherein the relationship graph is generated by:
  recursively and incrementally determining, until a predefined number of paths has been reached, a shortest direct path between the plurality of concepts of the user input query,
  for each of the predefined number of paths, extracting a logic formula from each respective path of the predefined number of paths by selecting a conjunction of types and relations represented by each edge of the plurality of concepts of the respective path, and
  adding the logic formula representative of each respective path of the predefined number of paths to the domain ontology, wherein, the expanded user input query is re-executed against the plurality of unstructured text data subsequent to adding the logic formula; and
 displaying one or more results comprising the expanded user input query and derived relationship graph on the user interface of the computer.

2. The method of claim 1, further including expanding the user input query using the logical reasoning operation and the domain ontology having a set of logical rules.

3. The method of claim 1, further including extracting the statements from the plurality of unstructured text data according to the expanded user input query with associated confidence scores.

4. The method of claim 1, further including identifying a direct relationship from the statements between the plurality of concepts using the domain ontology and a set of logical rules.

5. The method of claim 1, further including inferring an indirect relationship from the statements between the plurality of concepts using the domain ontology and a set of logical rules.

6. The method of claim 3, further including asserting or inferring the statements with the associated confidence scores from the statements using the domain ontology and a set of logical rules.

7. The method of claim 1, wherein extracting the relationship graph further includes combining both extracted and inferred relationships, and direct and indirect relationships between the plurality of concepts using the domain ontology and a set of logical rules.

8. A system for relationship graph expansion and extraction, comprising:
 one or more computers with executable instructions that when executed cause the system to:
  receive, via a user interface of the one or more computers, a user input query specifying a plurality of concepts;
  search a plurality of unstructured text data to generate relationships between the plurality of concepts, wherein generating the relationships includes expanding the user input query using a logical reasoning operation to infer the relationships between the one or more concepts notwithstanding whether the plurality of concepts are directly asserted to one another in the plurality of unstructured text data, and wherein inferring the relationships includes identifying, within the plurality of unstructured text data, a correlation between two or more indirect and independent statements being sub-components of a respective two explicit concepts of the plurality of concepts to generate a new concept not identified in the plurality of unstructured data prior to the searching and omitted from the user input query;
  extract a relationship graph between the plurality of concepts from the plurality of unstructured text data based on the expanded user input query according to a domain ontology, wherein the relationship graph is generated by:
   recursively and incrementally determining, until a predefined number of paths has been reached, a shortest direct path between the plurality of concepts of the user input query,
   for each of the predefined number of paths, extracting a logic formula from each respective path of the predefined number of paths by selecting a conjunction of types and relations represented by each edge of the plurality of concepts of the respective path, and
   adding the logic formula representative of each respective path of the predefined number of paths to the domain ontology, wherein, the expanded user input query is re-executed against the plurality of unstructured text data subsequent to adding the logic formula; and display one or more results comprising the expanded user input query and derived relationship graph on the user interface of the computer.

9. The system of claim 8, wherein the executable instructions expand the user input query using the logical reasoning operation and the domain ontology having a set of logical rules.

10. The system of claim 8, wherein the executable instructions extract the statements from the plurality of unstructured text data according to the expanded user input query with associated confidence scores.

11. The system of claim 8, wherein the executable instructions identify a direct relationship from the statements between the plurality of concepts using the domain ontology and a set of logical rules.

12. The system of claim 8, wherein the executable instructions infer an indirect relationship from the statements between the plurality of concepts using the domain ontology and a set of logical rules.

13. The system of claim 10, wherein the executable instructions assert or infer the statements with the associated confidence scores from the statements using the domain ontology and a set of logical rules.

14. The system of claim 8, wherein, pursuant to extracting the relationship graph, the executable instructions combine both extracted and inferred relationships, and direct and indirect relationships between the plurality of concepts using the domain ontology and a set of logical rules.

15. A computer program product for, by a processor, relationship graph expansion and extraction, the computer program product comprising a non-transitory computer-readable storage medium having computer-readable program code portions stored therein, the computer-readable program code portions comprising:

an executable portion that receives, via a user interface of a computer, a user input query specifying a plurality of concepts;

an executable portion that searches a plurality of unstructured text data to generate relationships between the plurality of concepts, wherein generating the relationships includes expanding the user input query using a logical reasoning operation to infer the relationships between the one or more concepts notwithstanding whether the plurality of concepts are directly asserted to one another in the plurality of unstructured text data, and wherein inferring the relationships includes identifying, within the plurality of unstructured text data, a correlation between two or more indirect and independent statements being sub-components of a respective two explicit concepts of the plurality of concepts to generate a new concept not identified in the plurality of unstructured data prior to the searching and omitted from the user input query;

an executable portion that extracts a relationship graph between the plurality of concepts from the plurality of unstructured text data based on the expanded user input query according to a domain ontology, wherein the relationship graph is generated by:

recursively and incrementally determining, until a predefined number of paths has been reached, a shortest direct path between the plurality of concepts of the user input query, for each of the predefined number of paths, extracting a logic formula from each respective path of the predefined number of paths by selecting a conjunction of types and relations represented by each edge of the plurality of concepts of the respective path, and adding the logic formula representative of each respective path of the predefined number of paths to the domain ontology, wherein, the expanded user input query is re-executed against the plurality of unstructured text data subsequent to adding the logic formula; and an executable portion that displays one or more results comprising the expanded user input query and derived relationship graph on the user interface of the computer.

16. The computer program product of claim 15, further including an executable portion that expands the user input query using the logical reasoning operation and the domain ontology having a set of logical rules.

17. The computer program product of claim 15, further including an executable portion that extracts the statements from the plurality of unstructured text data according to the expanded user input query with associated confidence scores.

18. The computer program product of claim 15, further including an executable portion that:

identifies a direct relationship from the statements between the plurality of concepts using the domain ontology and a set of logical rules; and infers an indirect relationship from the statements between the plurality of concepts using the domain ontology and a set of logical rules.

19. The computer program product of claim 15, further including an executable portion that asserts or infers the statements with the associated confidence scores from the statements using the domain ontology and a set of logical rules.

20. The computer program product of claim 17, further including an executable portion that, pursuant to extracting the relationship graph, combines both extracted and inferred relationships, and direct and indirect relationships between the plurality of concepts using the domain ontology and a set of logical rules.

* * * * *